United States Patent [19]

Murphy et al.

[11] Patent Number: 5,315,583
[45] Date of Patent: May 24, 1994

[54] METHOD AND APPARATUS FOR DIGITAL AUDIO BROADCASTING AND RECEPTION

[75] Inventors: John L. Murphy, San Francisco; Mark J. Rich, Menlo Park, both of Calif.

[73] Assignee: USA Digital Radio, Los Angeles, Calif.

[21] Appl. No.: 684,529

[22] Filed: Apr. 11, 1991

[51] Int. Cl.$^5$ .............................................. H04J 13/00
[52] U.S. Cl. ..................................... 370/18; 370/69.1; 375/1; 375/54; 371/37.4; 371/40.3; 381/4
[58] Field of Search ...................... 370/76, 110.4, 69.1, 370/76, 18, 20, 71, 124, 73; 375/1, 54; 455/6.1, 6.3; 381/4; 371/37.4, 40.3

[56] References Cited

U.S. PATENT DOCUMENTS

| | | | |
|---|---|---|---|
| 3,845,412 | 10/1974 | Rearwin et al. | 375/42 |
| 4,206,320 | 6/1980 | Keasler et al. | 370/11 |
| 4,379,947 | 4/1983 | Warner | 370/69.1 |
| 4,385,381 | 5/1983 | Alexis | 370/76 |
| 4,425,642 | 1/1984 | Moses et al. | 370/76 |
| 4,438,511 | 3/1984 | Baran | 370/19 |
| 4,491,943 | 1/1985 | Iga et al. | 370/13 |
| 4,495,620 | 1/1985 | Steele et al. | 370/110.4 |
| 4,601,045 | 7/1986 | Lubarsky | 375/38 |
| 4,672,605 | 6/1987 | Hustig et al. | 370/76 |
| 4,719,628 | 1/1988 | Ozaki et al. | 371/37.4 |
| 4,754,458 | 6/1988 | Dornstetter | 371/40 |
| 4,972,484 | 11/1990 | Theile et al. | 381/37 |

FOREIGN PATENT DOCUMENTS 8200074  1/1982  World Int. Prop. O. ............ 370/76

OTHER PUBLICATIONS

Cimini, Jr., "Analysis and Simulation of a Digital Mobile Channel Using Orthogonal Frequency Division Multiplexing," IEEE Transactions on Communications, vol. COM-33, No. 7, pp. 665-675 (Jul. 1985).
"Modern Communication Principles," by S. Stein and J. J. Jones (McGraw Hill, 1967).
D. L. Nielson, "Microwave Propagation and Noise Measurements for Mobile Digital Radio Application," report for ARPA SRI Project 2325 (Jan. 1975).
W. W. Peterson, E. J. Weldon, Jr., "Error-Correction Codes," MIT Press (1973).
Shu Lin, "An Introduction to Error-Correcting Codes," Chapter 6, pp. 112-119, Prentice Hall (1970).
John A. C. Bingham, "Multicarrier Modulation for Data Transmission: An Idea Whose time Has Come," IEEE Communications Magazine, vol. 28, No. 5, pp. 5-14 (May 1990).

Primary Examiner—Benedict V. Safourek
Assistant Examiner—Chau T. Nguyen
Attorney, Agent, or Firm—Townsend and Townsend Khourie and Crew

[57] ABSTRACT

A radio broadcasting system for a composite signal consisting of a frequency modulated (fm) analog signal and a multicarrier modulated digital signal is provided which is resistive to multipath degradation. The fm signal and the digital multicarrier modulated signal are fully coherent. The digital signal uses a plurality of carriers having a maximum amplitude at least 20 dB below the unmodulated fm signal. The multicarrier modulated signal is phase locked to a recovered analog fm pilot tone in the composite baseband spectrum of the fm signal which is at least 20 dB above the multicarrier modulated signal, which enables rapid and reliable acquisition of signal for coherent detection. In a specific embodiment the multicarrier modulated signal is a synthesized vector-modulated signal which is a quadrature phase shift keyed (QPSK) modulated set of synthesized carriers each occupying 9.5 kHz of spectrum replicated twenty-one times within a 199.5 kHz bandwidth with no more than two bits per vector. An efficient channel coding consisting of high efficiency block coding, such as BCH 255, 239 code, is employed in connection with time interleaving of bits to mitigate the effects of frequency selective multipath and broadband multipath. The broadcast system is designed to be used in support of compressed digital audio programming material. In demodulation, a demodulator is phased-locked to the recovered high-amplitude analog pilot tone to coherently demodulate the digital signal, to deinterleave, to decode the block encoded signal and to format the recovered data stream for source decoding.

25 Claims, 4 Drawing Sheets

METHOD AND APPARATUS FOR DIGITAL AUDIO BROADCASTING AND RECEPTION

CROSS-REFERENCE TO RELATED APPLICATIONS

This application is related to U.S. patent application Ser. No. 07/683,945 filed Apr. 11, 1991 and to U.S. patent application Ser. No. 07/683,918 filed Apr. 11, 1991, both entitled METHOD AND APPARATUS FOR DIGITAL AUDIO BROADCASTING AND RECEPTION.

BACKGROUND OF THE INVENTION

This invention relates generally to the field of digital broadcast communication through the medium of free space, and more particularly, to the field of digital audio broadcasting in spectral regions relying on line-of-sight communications subject to signal fade due to multipath propagation.

In recent years, the quality of commercial audio broadcast signals as delivered by radio transmitters through free space has been eclipsed by the quality of stored program material such as compact digital audio disk technology and digital audio tape technology. The quality differential of stored program material over conventional analog frequency modulated broadcasting is so great that there has been a market shift in listener preference to stored program material. In the past, commercial frequency modulated broadcast signals were considered comparable in quality to stored program material. However, the increase in quality of stored program material and the degradation in fm signal quality, particularly in urban areas, has resulted in a differential in quality that is reflected in decrease in listenership and substantial revenue loss to broadcasters.

One of the reasons for degradation in quality of fm signals is the inherent problems with line of sight propagation of radio signals. Radio signals are subject to interference and fading from specularly-reflected copies of the signal, both narrow-band and broadband. The interference is commonly referred to as multipath. Multipath results in fade which is dependent upon frequency, time and spatial factors. However, a free space signal is generally unaffected by group delay, which is generally associated with other types of media such as copper wires, coaxial cables, fiber optics and waveguides. A careful analysis of the propagation problem in connection with other limiting factors, such as other available spectrum and compatibility with other broadcast services, has revealed that no system exists or is even been suggested as suitable to address the problem of delivering a high-quality broadcast signal of sufficient efficiency and practicality to be commercially viable.

One digital audio broadcasting scheme promoted as potentially viable is designated the Eureka 147 Project. Based on an implementation in the 1500 Hz microwave L-band, the Eureka 147 system proposes a single-transmitter, thirty-three channel system having a 7 MHz bandwidth and relying on an error-correcting convolutional encoding and decoding scheme. Implementation of such a system would involve substantial economic dislocation within the U.S. broadcast market and further, would require that the power be as much as 500 times higher than current analog broadcasting system power to operate comparably at the frequencies of interest. Of technical interest, the Eureka 147 system as proposed would not be able to share spectrum with any other broadcast service, and the use of the system would require that there be a central transmitter in each market and thus that each market be limited to thirty-three channels. The scheme, as proposed, is not particularly spectrum efficient, requiring guard bands between channels to mitigate against intersymbol interference. The system is intended to be multipath resistant. To this end there is a broad spectrum allocation of 7 MHz and a digitally-based error correction scheme.

The problem of reliable transmission and reception in the presence of severe multipath propagation has been explored in the past. For example, Cimini, Jr., reports in a paper entitled "Analysis and Simulation of a Digital Mobile Channel Using Orthogonal Frequency Division Multiplexing," *IEEE Transactions on Communications.* Vol. COM-33, No. 7, pp. 665-675 (July 1985), that broadband, narrow-band and time-dependent multipath problems in a harsh mobile environment are a substantial challenge to solve. The problems addressed therein presuppose the application of speech/data transmission on a frequency carrier at 850 MHz. Simulations were performed based on orthogonal frequency division multiplexing (a plurality of subcarriers or multitone modulation) with the 7.5 kHz channel bandwidth. Detection was based on coherent detection using one or more pilot signals transmitted in the same manner and at the same amplitude as the information signals. It was assumed that the co-channel interference would be at least 17 dB below the information carrier signals. Cimini identified that reliable retrieval of pilot signals is essential for accurate coherent detection and correction of data. Proposed specifically was a dual pilot system with interpolation in frequency between the pilots and orthogonal frequency division multiplexing wherein each tone is modulated by a quadrature phase shift keyed (QPSK) modulator. It was therein recognized that quadrature phase shift keying had a 3 dB advantage in gain over differential quadrature phase shift keyed modulation and detection.

Error correction techniques are well known for correcting errors in digitally-modulated information signals. The use of error correction techniques provide substantial advantage over conventional analog signaling because detection of less than a complete portion of the signal can still result in recovery of all of the information intended to be communicated. The exact form of error correction and encoding plays a significant role in the efficiency and integrity of the transmitted signal. It is important for example that the selected error correction technique be one which does not so degrade the channel efficiency as to render it impractical.

Multiple-channel digital transmission systems have been known in various environments. For example, the U.S. Military RAKE System is described in "Modern Communication Principles," by S. Stein and J. J. Jones (McGraw Hill, 1967). Other references on multi-channel digital transmission systems include: D. L. Nielson, "Microwave Propagation and Noise Measurements for Mobile Digital Radio Application," SRI Report for ARPA SRI Project 2325, NTIS No. ADB073934C (January 1975); W. W. Peterson, E. J. Weldon, Jr., Error-Correction Codes, MIT Press (1973); and Shu Lin, *An Introduction to Error-Correcting Codes*, Prentice Hall (1970).

Multiple-channel digital modulation techniques are also known and have been used in telephone line modem technology, such described in U.S. Pat. No. 4,206,320 to Keasler et al. (June 1980), U.S. Pat. No. 4,438,511 to Baran (March 1984), U.S. Pat. No. 4,601,045 to Lubarsky (July 1986) and U.S. Pat. No. 4,754,458 to Dornstetter (June 1988). The last-named patent is believed to describe a technology in the proposed Eureka 147 system. The Dornstetter patent describes the use of a digital modulation scheme capable of correcting certain types of errors and specifically, burst errors. The system uses convolutional coding and a decoding algorithm based on a Berlekamp-Massey algorithm. The error correction scheme is based on the calculation of coefficients of code words by obtaining polynomials from the factorization over a Galois field of elements. The result is a relatively inefficient use of bandwidth.

An instructive survey article on multicarrier modulation is by John A. C. Bingham, entitled "Multicarrier Modulation for Data Transmission: An Idea Whose Time Has Come," *IEEE Communications Magazine*, Vol. 28, No. 5, pp. 5-14 (May 1990). This article deals with many of the problems related to multicarrier modulation and identifies areas requiring further development. The principal focus of use of multicarrier modulation has, however, been in connection with communication through impaired channels, such as telephone lines. Frequently, in such environments, there is two-way communication to promote retransmission of lost information.

What is needed is a one-way (broadcast) transmission system which is efficient and sufficiently robust to be able to communicate high-fidelity audio program material in a manner which is compatible with existing U.S. broadcast services, particularly fm broadcast services.

SUMMARY OF THE INVENTION

According to the invention, a radio broadcasting system is provided for transmitting and receiving through free space a combined signal consisting of a frequency modulated (fm) analog signal and a multicarrier modulated digital signal which is especially adapted to be resistive to multipath degradation in the frequency spectrum between about 80 MHz and 120 MHz. According to the invention, the fm signal and the digital multicarrier modulated signal are fully coherent and sufficiently orthogonal that the fm signal can be demodulated without degradation by the multicarrier modulated signal. Further according to the invention, the digital signal comprises a plurality of carriers having a maximum amplitude at least 20 dB below the unmodulated fm signal and preferably, 30 dB below the analog signal. The multicarrier modulated signal is phase locked according to the invention to the recovered analog fm pilot tone at 19 kHz in the composite baseband spectrum of the fm signal which is at least 20 dB above the multicarrier modulated signal, which enables rapid and reliable acquisition of signal for coherent detection. In a specific embodiment, the multicarrier modulated signal is a synthesized vector-modulated signal which is a quadrature phase shift keyed (QPSK) modulated set of synthesized carriers each occupying 9.5 kHz of spectrum replicated twenty-one times within a 199.5 kHz bandwidth with no more than two bits per vector. Guard time and guard bands are eliminated, and the symbol intervals are of sufficient time duration to mitigate the effects of intersymbol interference due to reflective multipath delay. Further according to the invention, an efficient channel coding consisting of high efficiency block coding, based on a cyclic code, such as a Bose-Chaudhurei-Hocquengheim code (BCH code), which uses a large block size (over 200 bits), is employed in connection with time interleaving of bits to mitigate the effects of frequency selective multipath and broadband multipath. The broadcast system is designed to be used in support of compressed digital audio programming material. In a spectrum where the analog fm also resides, various techniques may be used to reuse the frequency. In a demodulation process according to the invention, a demodulator is operative to phase lock to the recovered high-amplitude analog pilot tone, to coherently demodulate the digital signal, optionally to equalize phase, to deinterleave, to decode the block encoded signal and to format the recovered data stream for source decoding. Interleaving, frequency reuse and specific block encoding are operations which are dependent on tradeoffs in the level of required error recovery in the given environment. Interleaving for example provides time diversity which is useful for combating broadband short duration interference, and the encoding provides the desired level of error correction in exchange for reduced ratio in the size of the information block to the correction block. Coherent detection of large block codes provides the most efficient basic digital coding structure for accurate recovery of broadcast signals.

The invention will be better understood by reference to the following detailed description in connection with the accompany drawings.

DESCRIPTION OF SPECIFIC EMBODIMENTS

In order to obtain a robust and high quality signal through a broadcast-type (one-way) communications channel, it is important to understand the characteristics of the channel. As a consequence, the approach herein has been to analyze the channel and then to devise a system optimized to the channel characteristics.

An analysis of available technical test data has indicated that the frequency spectrum between 80 MHz and 120 MHz, roughly the range used by commercial fm broadcasting stations within the United States of America and elsewhere, is subject primarily to multipath fading and only secondarily to any nonlinear effects in a free-space channel. Moreover, the channel characteristics of actual fm broadcast stations vary with transmitter location, receiver location and terrain between the transmitter location and the receiver location. Among the most difficult channel characteristics to deal with are those in the context of a moving receiver location in connection with a transmitter which is located close to a number of significant terrain obstacles which may block or reflect the transmitted signal along a multitude of paths between the transmitter and the receiver. Such an environment can cause narrow-band notches in the received spectrum of on the order of 10 kHz to 20 kHz in bandwidth. In the present invention, a multiple-carrier modulation scheme based on a digital polyvector synthesized modulation scheme has been devised which comprises multiple adjacent carriers which are phase modulated to support two bits per Hertz. In the case of narrow-band fade, therefor, less than ten percent of the carriers in a 200 kHz bandwidth is subject to fade to the point of being undetectable. The ten percent error rate occurs in only a small portion of the band and is dispersed within a serial data channel by various coding techniques according to the invention, and errors in the recovered signal are corrected by the use of a mathematically-sophisticated but proven digital error correcting encoding and decoding scheme made practical by the use of coherent modulation and coherent demodulation which takes full advantage of coherency with a co-channel analog fm signal.

Research and analysis has disclosed that the communications channels of interest are also subject to short-delay multipath. Short-delay multipath has the effect of broadband notching (fade) within bandwidths on the order of 80 kHz to 480 kHz. These broadband notches can result in loss of an entire signal in the bandwidth of interest for a period of time corresponding to the time in which a receiver antenna system is within a cell defined by distance of one half wavelength along the signal propagation path (a fade cell). Whereas prior art systems have attempted to address this problem by implementation of extremely broadband (spread spectrum) modulation techniques, in accordance with the invention, broadband notching is mitigated against by interleaving data in time prior to transmission and reciprocally deinterleaving the data after reception so that the data is sufficiently distributed over time that dwell of the receiver within the fade cell is statistically substantially less than the time required to transmit and receive sufficient data signal to recover the information in the blocked signal. Since it is assumed that the receiver is in motion, "picket fencing" associated with conventional fm broadcast stations is virtually eliminated in the case of digital broadcast.

The errors in the digital data appear as burst errors from broadband notches or data dropouts in narrow-band notches over relatively long intervals of time. The resulting increase in error rate based on investigation of channel characteristics for a low velocity receiver (moving about seven meters per second) is about one in one hundred bits.

The specific multipath characterization for fm broadcast employed in devising the present invention for application in the commercial fm band is based on statistical analysis of samples of data obtained in New York City and San Francisco, which are representative of two worst-case extremes, namely, a transmitter within a crowded urban environment and a transmitter remote from the urban center wherein the receivers are in a crowded urban setting. In both extremes, the receivers are frequently blocked from the transmitter site as the receivers move through the coverage area.

It has been determined that multipath delays resulting from specular reflection or multiple paths caused from various reflective sources is on the order of 0.5 microseconds to 20 microseconds. The number of simultaneous paths for all propagation environments is between 2 and 20. Signal suppression relative to free space propagation is between 10 dB and 50 dB, with the statistically worst-case condition for short multipath being delays of 0.5 microseconds to 5 microseconds, signal suppression to 50 dB and three simultaneous paths of signal. These short delays result in cancellation bandwidths of 120 kHz to 480 kHz with a particular worse case multipath condition of a 50 percent probability of occurring within a 50 to 100 foot area in a highly urbanized environment. Movement by a nominal half wavelength (about two meters) within any 100 foot area cures the worst-case multipath condition.

According to the invention, this situation can be mitigated by providing error correction in the data and interleaving with a interleaver size of about 25,000 bits to 100,000 bits, the size being dependent upon the estimated minimum velocity of the receiver. The resulting increased error rate from a broadband fade is on the order of $10^{-2}$. This can be corrected by a block code of moderate complexity with added bits. A 255-bit long BCH code having 239 data bits is adequate to compensate for the increased bit error rate due to such fade, and an interleaver with 10,000 bits to about 5 Megabits ($1000 \times 5000$) as an interleaver block size will spread out the burst errors sufficient that the block code can recover from those errors.

Digital compressed audio programming such as contemplated (Masking-pattern-adapted Universal Subband Integrated Coding And Multiplexing, or MUSICAM) would provide for example a 24 millisecond long block size in real-time broadcasting so that block codes have particular advantage in the contemplated digital modulation scheme.

Narrow-band multipath fades are readily addressed by providing frequency diversity through the use of multicarrier modulation. Multicarrier modulation inherently increases the baud time of each carrier. For example, in a system according to the one herein devised, the symbol transmission time is in excess of 50 milliseconds. Since only a small member of carriers are degraded from a narrowband notch, only about 10 percent to 20 percent of the data is lost. The result increases the data rate by $2 \times 10^{6-2}$. The increased error rate can readily be corrected using the BCH cyclic block code as herein proposed. BCH codes are described in standard references, such as *An Introduction to Error-Correcting Codes*, by Shu Lin, Prentice-Hall, 1970, pp. 112–114.

Figure 1:
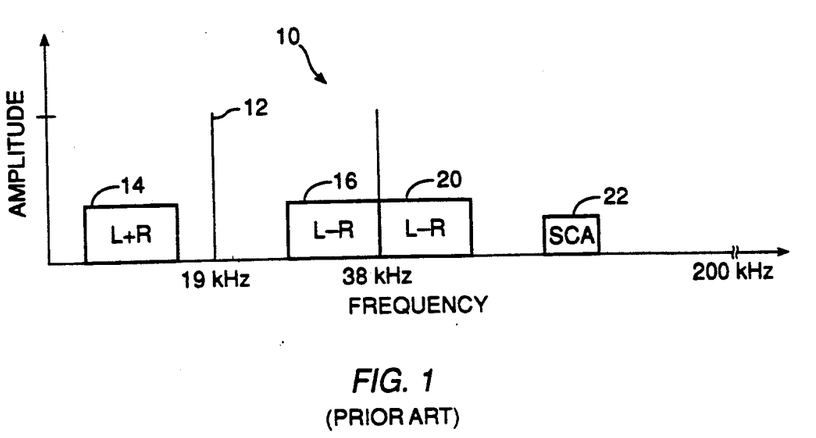
FIG. 1 is a graph of an analog baseband composite band plan of a standard fm transmitter in the prior art.

Referring to FIG. 1, there is shown a prior art analog baseband composite band plan 10 of a standard analog fm transmitter. Of particular significance, the band plan 10 includes a full amplitude unmodulated pilot tone 12 at 19 kHz, along with other channels 14, 16, 18, 20, 22 for combination and differential signals, and for side carriers under Subsidiary Communication Authorization (SCA). The pilot tone 12 is injected for use in coherent fm detection according to the prior art analog signal recovery technique.

Figure 2:
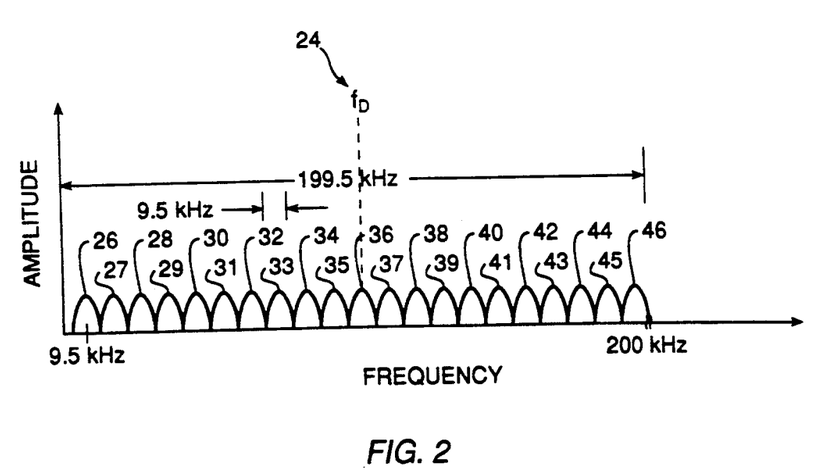
FIG. 2 is a graph of a digital baseband composite of one type of digital polyvector signal in accordance with the present invention.

Referring to FIG. 2, there is shown a digital baseband composite of one type of digital polyvector signal 24 in accordance with the present invention. The number of channels and the spectral allocation of each channel is dependent on baud rate and coding. One specific embodiment in which the number of tones is twenty-one tones is shown for illustrative purposes only. The principles apply equally to a specific embodiment of thirty-two tones, which is considered preferable, or to an embodiment of sixteen tones, which may be less complex to implement. In the exemplary embodiment illustrated in FIG. 2 herein, the baseband composite comprises twenty-one tones 26-46, with tones 27-46 each being an integral multiple of a base tone 26 centered at 9.5 kHz. Each tone 26-46 is allocated 9.5 kHz bandwidth for modulation without guard bands in adjacent channels between a frequency of 4.75 Hz and a frequency of 204.25 kHz. The total bandwidth allocation is 199.5 kHz. The bandwidth of 9.5 kHz allocated to each tone is represented by the finite spectral width of each tone in FIG. 2.

Each tone 26-46 is vector modulated in accordance with a synthesizing scheme. A vector is assigned to each tone whose phase defines the bit value of that tone. Each vector is encoded with no more two bits by quadrature phase shift keyed (QPSK) modulation. As hereinafter explained, the polyvector QPSK modulation scheme is realized by synthesizing each of the channels by digital signal processing methods so that each of the channels represented by tones 26-46 is phase coherent with each of the other channels and further according to the invention, all of the channels 26-46 are phase coherent with the unmodulated analog fm pilot tone 12 (FIG. 1) at 19 kHz. The exact phasing of the modulated tones is determined by the digital values of the source data. The phase states of each of the tones 26-46 form a single symbol, and all phases of the tones 26-46 change simultaneously at a rate of up to 9500 symbols per second (19 kbaud), which yields a channel capacity of 399 kilobits per second.

A preferred alternative band plan is contemplated to decrease the baud rate. Specifically, a modulation scheme consisting of thirty-two phase-coherent tones with a base tone at 6.25 kHz and phase-coherent higher tones at multiples of 6.25 kHz would provide a total bandwidth occupancy of 200 kHz between 3.175 kHz and 203.175 kHz with a channel capacity of 400 KBPS while employing a baud rate of only 6.25 kilosymbols per second on each channel. In addition to further lengthening the baud time to spread out data, a thirty-two-tone-based multicarrier modulation scheme also has the advantage of potentially-favorable compatibility with digital signal processing equipment which rely on powers of two for multiplication.

A frequency domain signal of the analog baseband composite (e.g., the signal value in the time domain of the composite baseband signal) is transformed into a frequency modulated (fm) signal with a maximum frequency deviation of 200 kHz (+100 kHz and −100 kHz) allotted to the primary fm signal. Specifically, an exemplary sinusoidal (unmodulated tone) signal is mapped in time across 200 kHz bandwidth by converting instantaneous voltage to frequency. In a one-for-one transformation, zero volts (0 V) may be designated as corresponding to a center frequency as for example at an intermediate frequency of 10.5 MHz, plus one volt (+1 V) is designated as corresponding to a frequency of +100 kHz (10.6 MHz in the IF) and minus one volt (−1 V) may be designated as corresponding to a frequency of −100 kHz (10.4 MHz in the IF) relative to the center frequency.

Figure 3:
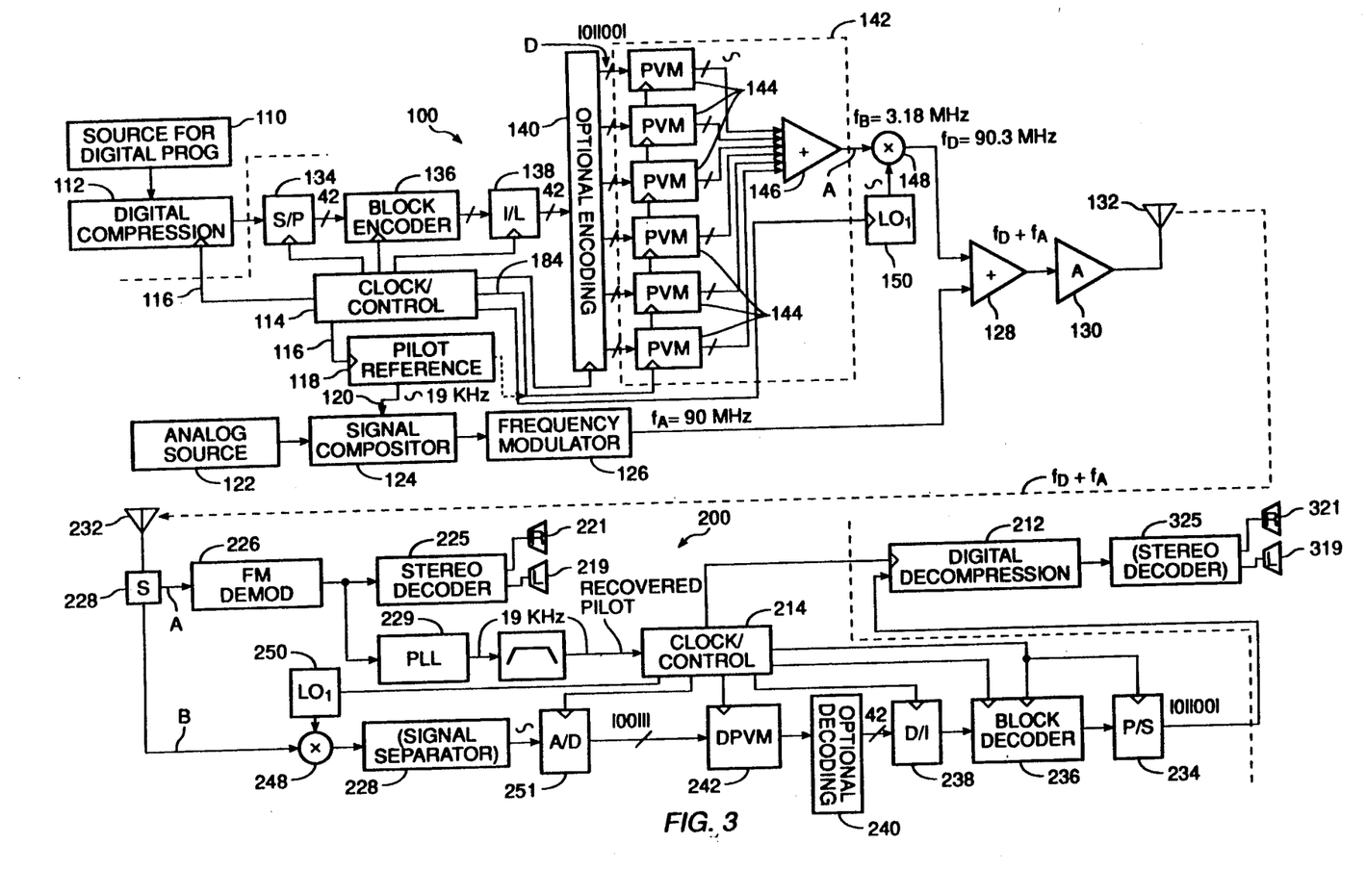
FIG. 3 is a block diagram of a complete broadcast system with a transmitter system and a receiver system according to the invention.

Referring to FIG. 3, there is shown a block diagram of a transmitter system 100 and a receiver system 200 in accordance with one embodiment of the invention. Coupled to the transmitter system is a source 110 of digitized program material, such as digitized audio or data, and particularly if the source material is audio, there is provided a digital compression apparatus 112 to reduce the bandwidth requirements of the audio signal.

A suitable audio compressor might operate in accordance with the MUSICAM standard described in U.S. Pat. No. 4,972,484 issued Nov. 20, 1990 in the name of Theile et al.

In accordance with the invention, a central clock and control subsystem 114 is provided as for synchronization of all clock signals, including an input clock signal on clock line 116 to the digital compressor 112. Central clocking and close control of phase assures coherence of both analog and digital systems of the transmission system 100. Importantly, the central clock and control subsystem 114 generates a sync signal on clock line 116 to a pilot reference element 118 or equivalent, which generates as an output a pilot tone or equivalent on signal line 120 for the analog subsystem.

The analog subsystem may be a conventional analog fm transmitter front end comprising an analog source 122 coupled to a signal compositer 124, which in turn is coupled to a frequency modulator 126. The analog source may be any program source, but it is typically an audio program source with the possible addition of a data program source on a side carrier. The signal compositer 124 is representative of the stage which produces the composite baseband signal (FIG. 1), including the coherent unmodulated pilot tone 12 from the pilot reference 118. The frequency modulator is a subsystem which modulates the composite baseband signal out of the signal compositer 124 in frequency across a 200 kHz bandwidth in proportion to instantaneous amplitude of the composite signal to produce an output signal centered about a center frequency $f_A$. The center frequency is selected to be in the fm broadcast band, at for example 90 MHz, and it is applied through a linear mixer or combiner 128 to an amplifier 130 and hence to a transmission antenna 132.

The balance of the transmitter system 100 shown is a digital multicarrier modulator. Digital output of the compressor 112 in the form of a serial bit stream of ones and zeroes is coupled to be applied serially to a serial-to-parallel converter 134. The serial-to-parallel converter 134 transforms the serial bit stream into units of for example 42 bits under synchronous control of the clock control subsystem 114. In another embodiment, the units may consist of exactly 64 bits or 32 bits.

The serial-to-parallel converter 134 is coupled to a block encoder 136 which is synchronized to the clock control subsystem 114. The block encoder 136 preferably operates as follows to encode the input data into an error correcting code of sufficient robustness to correct for narrow band long-interval errors: The block encoder 136 encodes blocks of input data into blocks of output data comprising at least 200 encoded data bits and no more than 20 encoded check bits according to the BCH encoding scheme. A particularly appropriate block code is the BCH (239,255) code, which 239 data bits in a block of 255 bit. This code has been calculated to provide error correction within the specifications of the conditions for a broadcast system of the type suitable for use in the fm broadcast band around 95 MHz in an urban environment. Moreover, a BCH (239,255) code is more than 93% efficient, which is a factor where efficient spectrum. The details of conventional BCH encoding decoding schemes are known in the digital error-correcting coding art, although it is believed that long block codes have in the past been considered to be too long and too complex for practical implementation. Recent advances in circuit and digital signal processing technologies now make it possible to implement commercially practical systems employing long block codes.

The output of the block encoder 136 is applied to an interleaver 138. The interleaver 138 is for distributing the block encoded data over an extended time interval to mitigate against burst errors and other short-interval fading phenomena. An interleaver with a capacity of 10,000 bits to about 5 Megabits (1000 bits by 5000 bits, the exact size being dictated by code word boundaries and the like) as the interleaver block size is deemed suited to provide the time diversity needed to support error correction by the BCH block code within the specifications of the conditions for a broadcast system of the type suitable for use in the fm broadcast band around 95 MHz in an urban environment. The interleaver 138 may be for example a two-port memory array which accepts data bits written in for example about 1000 input rows and provides as output data read out by columns from about 5000 output columns, to thereby distribute the related data bits over time and to interleave the data bits with others of a different time reference. Appropriate address control is provided to segment the output bits into blocks of the number of bits to be modulated as a symbol in a polyvector multicarrier modulator 142 as hereinafter explained. For example, the multicarrier modulator may receive as input for each single symbol a block of 42, 64 or 32 bits.

The output of the interleaver 138 may be further processed through an optional further encoding module 140. The further encoding module may implement a phase scrambling algorithm such as a Hamming code or Gray-type code to minimize symbol-to-symbol data bit transitions on each channel, or it may be used to implement a data encryption scheme requiring key values to decrypt at a receiver.

The digital output D of the interleaver 138 or optional encoding module 140 is applied to a multicarrier modulation subsystem 142. The resultant output A is an analog signal which is the equivalent of a plurality of equivalent tones which are spaced equally within a bandwidth of for example about 200 Hz, each of the equivalent tones being at a frequency which is an integer multiple of a base frequency tone and each one of said equivalent tones being constrained to be phase coherent with the unmodulated pilot tone 12 (FIG. 1). The multicarrier modulation subsystem 142 is coupled to accept the digital output D as the information input for quadrature phase shift key (QPSK) modulating each one of said equivalent tones to distribute digital output D simultaneously over substantially all of said equivalent tones in order to produce a multitone QPSK modulated signal A at a selected intermediate frequency (IF) carrier signal $f_B$.

There are various possible embodiments of the multicarrier modulation subsystem 142. It may be a single 64-input digital signal processing (DSP) module which is operative by fast Fourier transform techniques to synthesize a single sampled-data time domain output, which is applied to a single digital to analog converter producing a composite multitone modulated signal at a carrier frequency.

Figure 5:
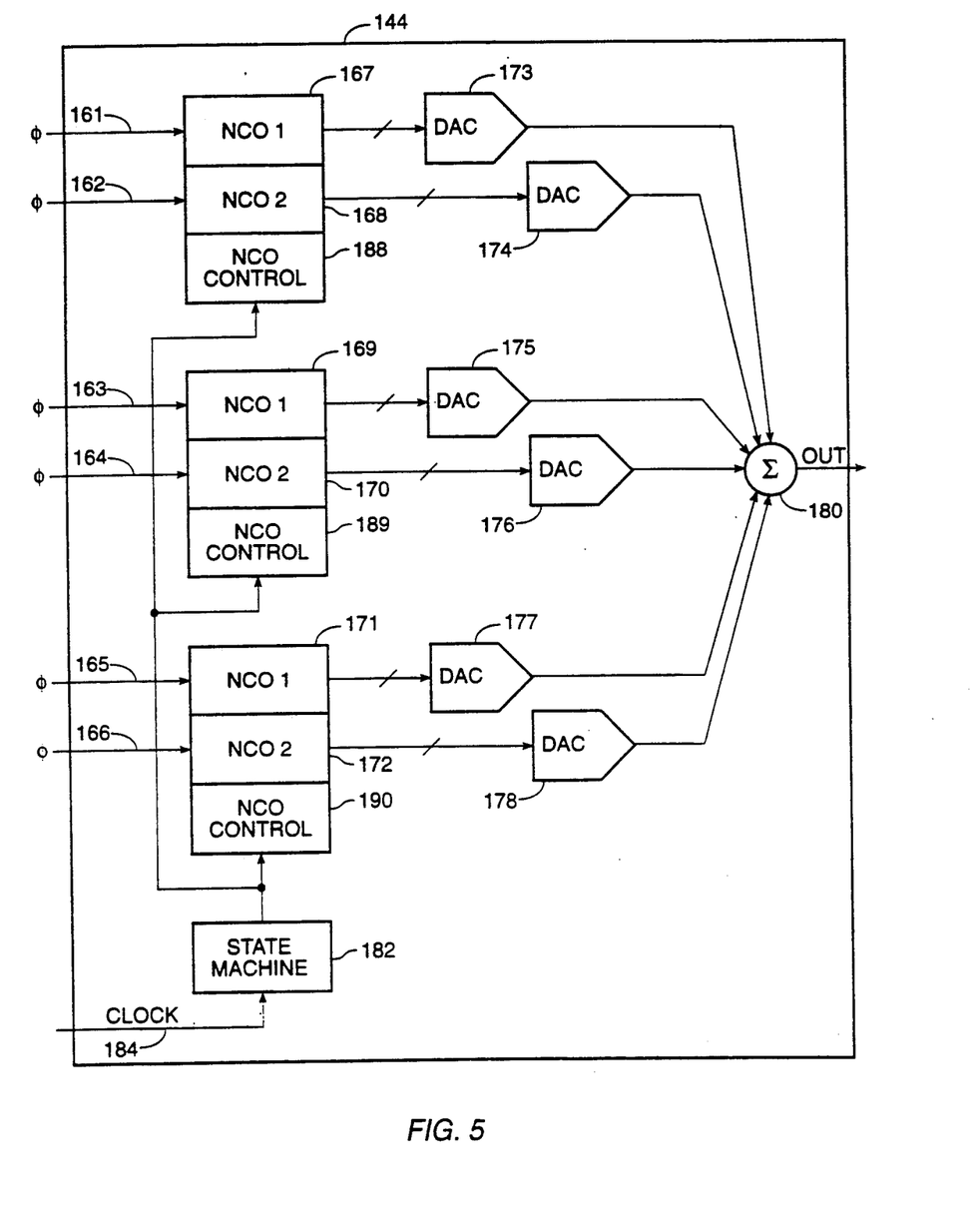
FIG. 5 is a block diagram of a polyvector modulator according to one embodiment of the invention.

Alternatively, the multicarrier modulation subsystem may be a bank of polyvector modulators 144, as shown in FIG. 5, and explained hereinafter, producing analog signal outputs at selected carrier frequencies around the baseband frequency $f_B$ and which are linearly combined in a summer 146 and supplied as an analog signal A wherein each of the tones are phase synchronous with one another.

In any event, the resultant phase-synchronous signal A at carrier frequency $f_B$ is translated by means of a multiplier 148 driven by a phase-synchronous local oscillator 150 to produce an analog signal which carries digitized information in the fm broadcast band $f_D$ and which shares part or all of the spectrum or is at least near or adjacent the frequency of the modulated analog signal $f_A$. The so-called "digital" signal $f_D$, which is phase coherent with the analog signal $f_A$ is also applied through the linear mixer or combiner 128. The amplitude of the digital signal $f_D$ is constrained to be at least one hundred times (20 dB) below and preferably at least 1000 times (30 dB) below the amplitude of the analog signal $f_A$ at the output of the combiner 128. The combined output is applied to the amplifier 130 and hence to the transmission antenna 132, by which it is radiated through free space to receivers, such as receiver system 200.

Figure 4:
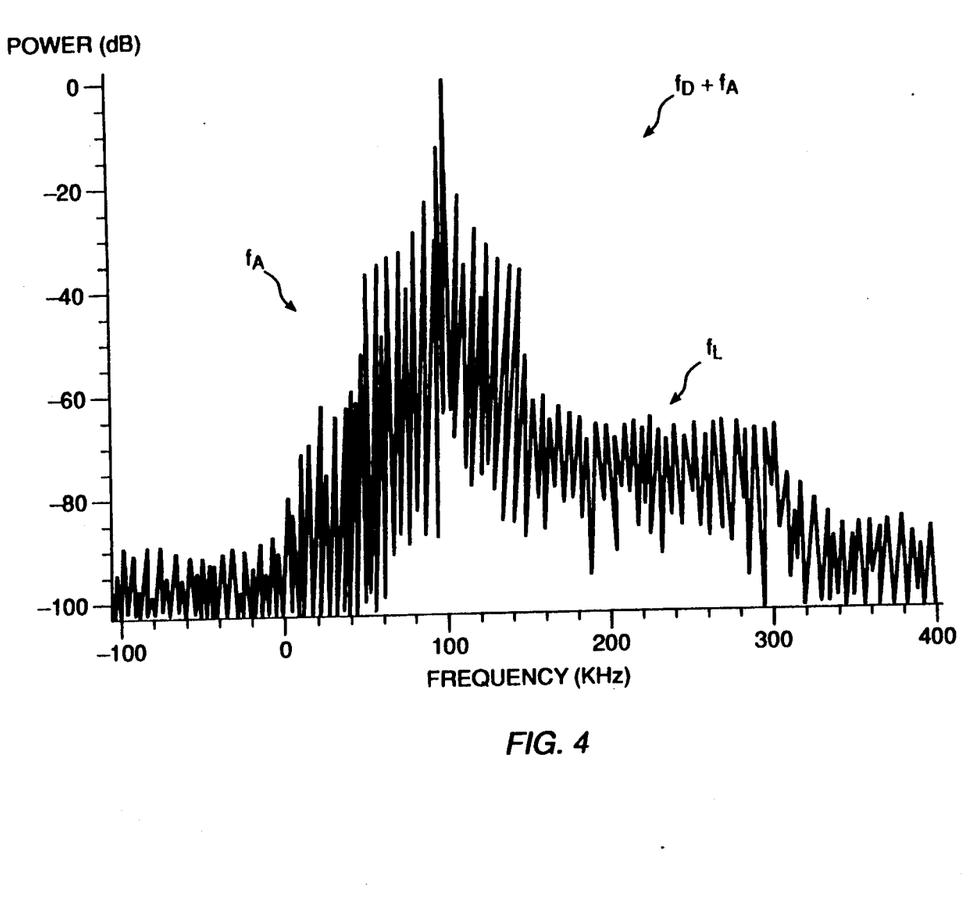
FIG. 4 is a spectral diagram of a combined analog modulated fm signal and a digitally-modulated multicarrier signal according to one embodiment of the invention.

Referring to FIG. 4, there is shown a representation of a combined fm and digitally-modulated signal $f_D+f_A$ according to one embodiment of the invention depicted at a single instant in time. The spectrum is normalized to a total bandwidth of about 300 kHz, with the fm portion $f_A$ occupying the portion between 0 kHz and 200 kHz and the digital portion $f_D$ occupying the portion between about 100 kHz and 300 kHz. During periods of low-amplitude modulation, there is very little energy from the fm portion above 100 kHz and average modulation keeps most of the power below about 120 kHz, so there is little overlap in spectrum. The dominant signal is the pilot tone. It will be noted that the digital portion of the signal is 30 dB below the peak amplitude of the analog portion $f_A$. A 20 dB to 30 dB signal-to-noise ratio is within the acceptable tolerance of the analog fm signal. Due to the phenomenon of fm capture, the noise contribution in overlapping spectral regions is not noticed in a correctly-frequency demodulated analog signal.

FIG. 5 is a block diagram illustration of a single PVM module 144 according to the invention. The PVM module 144 illustrated herein provides processing for six channels of input data, each channel input having a value of either a one or a zero, representing a phase state $\phi$ of $\pi$ or $2\pi$ (which is the same as 0). Thus, four modules 144 are needed to produce 21 tones of modulated output ($6 \times 4 = 24$) with three extra channels, and six modules 144 are needed to produce 32 tones of modulated output, leaving four extra channels. Alternatively, the PVM module 144 may be a four-tone card such that six cards are required to produce 21 tones ($4 \times 6 = 24$) with three extra channels. As shown, six inputs 161, 162, 163, 164, 165, 166 are provided to six numerically-controlled oscillators (NCOs) 167, 168, 169, 170, 171, 172, which in turn are coupled to respective digital to analog converters (DACs) 173, 174, 175, 176, 177, 178. The NCOs 167–172 are each coupled to receive a single digital bit input and are operative to produce an output in digital form which, when converted and integrated over time by the DACs 173–178 are quadrature-phase modulated tones, each of the tones centered at a different but related frequency according to position in the array of tones. The modulated tones are linearly combined in real time by a summer 180 and then fed to the module summer 146 (FIG. 3). A state machine 182 associated with the module 144 receives the clock signal on clock line 184 (FIG. 3) and provides the synchronization and control signals to each of the NCOs 167-172 through NCO controllers 188, 189, 190. The NCOs 167-172 each produce a stable (digital) parallel bit stream from which the tone waveform can be synthesized for one symbol period (1/9500 secs for a twenty-one channel system, 1/6250 secs for a 32 channel system, etc.) Sampling of each 9.5 kHz modulated tone at a nominal 3.18 MHz carrier may be at about 608 kilosamples/sec. There may be bandpass filters in the transmitter (not shown) and may be needed to remove parasitic and spurious signals.

The digital signal which is synthesized by each PVM module 144 according to the invention is realized in accordance with the following equation. The equation is general for any digital polyvector modulated multitone system in accordance with the invention:

$$DPVM(nT) = \sum_{j=1}^{J} [(A_j/\sqrt{2})u_{Ij}(nT)\cos(\omega_j nT + \pi/4) + (A_j/\sqrt{2})u_{Qj}(nT)\sin(\omega_j nT + \pi/4)$$

where:

DPVM(nT) is the digital output of the PVM module at sample number "n" of time interval "T" which can be converted directly into an analog signal with J tones at frequencies $\omega_j$, where j=1,2,3, etc.;
j is the index of the tone number (1 to 21, 1 to 32);
$A_j$ is the amplitude of each channel j, a constant;
$\omega_j$ is the selected tone frequency
$u_{Ij}$ is the input modulation of the in-phase component of the complex signal having values of only +1 or −1 (derived from 1 or 0 on input lines 161-166 and represent the phases 0 or $2\pi$ and $\pi$ or $3\pi/2$;
$u_{Qj}$ is the input modulation of the quadrature-phase component of the complex signal having values of only +1 or −1 (derived from 1 or 0 on input lines 161-166 and represent the phases 0 or $2\pi$ and $\pi$ or $3\pi/2$;
The phase is offset by $\pi/4$ to aid in detection;
$\omega_j$ is the frequency of the jth tone.

The sample numbers are n=0, 1, 2, 3, etc. The value nT is at an exemplary high sample rate (608 ksym/s at a selected intermediate frequency) to provide sufficient resolution for a 200 kHz bandwidth. The values nT map to the analog time variable t upon processing by a digital to analog converter.

Referring again to FIG. 3, the elements of a receiver 200 according to the invention are illustrated. A conventional antenna 232 is coupled to receive the combined signal $f_D+f_A$, is directed through a splitter 228 into a first signal path A and a second signal path B. A conventional frequency demodulator 226 produces an output from which a phase locked loop (PLL) 229 can extract from the first signal path A a replica of the unmodulated pilot tone at 19 kHz, which is used to synchronize clocks of a clock/controller 214. The pilot tone is so strong as compared to the digital signal $f_D$ that acquisition is extremely rapid and marked. Where access to the conventional analog audio programming material is desired, which is typically in stereo, a stereo decoder 225 is provided with appropriate amplification to produce audio outputs over loudspeakers 219 and 221.

The clock/control 214 may be used to control the coherent translation of the signal in path B to an intermediate frequency for easier processing. A local oscillator 250 and mixer 248 may be provided for this purpose. There may also be provided a signal separator 228 means in the second signal path B to separate a replica of the multitone QPSK modulated digital signal $f_D$ substantially from the combined signal. This may be as simple as a frequency-domain bandpass filter to separate signals in adjacent bands. In digital form, there might be a finite impulse response filter or the like. In principle, a time-domain filter may also be employed, wherein a replica of the frequency modulated signal without the "noise" of the digital signal is subtracted from the combined signal. Specific implementations are beyond the scope of this disclosure.

It is preferred according to the invention to process the digitally-modulated signal in a sampled digital domain in real time. An analog to digital filter 251 is provided to convert the signal into a parallel digital bit stream.

In accordance with the invention, a polyvector demodulator 242 is provided to process the digital data stream in the second signal path as a replica of the multitone QPSK modulated signal coherently with a representation of the replica of the unmodulated pilot tone (typically as a clock signal from clock/control 214 to coherently demodulate the replica of the multitone QPSK modulated signal into a replica of the digital representation of the block encoded signal. According to the invention, DSP techniques may be used. In a demonstration system a type-VE-32C-01V signal processing module manufactured by Valley enterprises of Tamaqua, Pa. was programmed to process a fast Fourier transform of the data stream into individual channels of data from which the phase information representing the binary digital modulation was directly derived. In a consumer receiver; a low-cost set of standard DSP chips, such as a supplied by Texas Instruments, may be used. Alternatively, custom semiconductor devices may be employed to synthesize the processor and reduce the cost.

There follows the DPVM unit 242 an optional decoding module 240 which is matched to the optional encoding module 140. A deinterleaver 238 matched to the interleaver 138 reorders the data bits in time, and a block decoder 236 matched to the block encoder 136 recovers the digital program material to the extent it is correctable within the error tolerance of the selected block code. The BCH code selected is particularly robust for this purpose. The combination of the deinterleaver and the block decoder makes it possible to decode the digital representation of the block encoded signal into output program material with correction of selected short-interval-dependent data errors, narrowband frequency-dependent data errors and long-interval broadband frequency dependent data errors, such as induced by multipath effects. A parallel-to-serial converter 234 produces the desired digital bit stream, which can then be applied to a digital decompressor 212 and to an optional stereo decoder 325 (for audio program material) which drives an audio output system represented by loudspeakers 319 and 321.

The invention has now been explained with reference to specific embodiments. Other embodiments will be apparent to those of ordinary skill in the art in light of this disclosure. The invention is therefore not intended to be limited, except as indicated by the appended claims.

What is claimed is:

1. A system for broadcast transmission and reception of an analog signal and digitized program material, including means for producing an analog frequency modulated (fm) signal from a composite baseband signal, and a transmitter for transmission of at least said analog fm signal, wherein said composite baseband signal includes a single unmodulated pilot tone said broadcast system comprising:

a transmitter system comprising:

first signal processing means coupled to accept digitized program material from a source of digitized program material for encoding said digitized program material according to an error-correcting block code of predetermined length and predetermined error correcting capability to produce a digital representation of a block encoded signal;

second signal processing means for generating an equivalent of a plurality of equivalent tones which are spaced equally at a baseband between 0 Hz and a selected maximum frequency, each of said equivalent tones being at a frequency which is an integer multiple of a base frequency tone and each one of said equivalent tones being constrained to be phase coherent with said unmodulated pilot tone by means of a master clock, said second signal processing means being means coupled to accept said digital representation of said block-encoded signal for quadrature phase shift key (QPSK) modulating each one of said equivalent tones with said digital representation of said block-encoded signal thereby to distribute said digital representation of said block-encoded signal over substantially all of said equivalent tones in order to produce a multitone QPSK modulated signal at a selected intermediate frequency carrier signal;

means for linearly combining said analog fm signal and said multitone QPSK modulated signal, said multitone QPSK modulated signal having a magnitude when combined with said analog fm signal of at least 100 times less than the magnitude of said analog fm signal, to produce a combined information signal; and means for broadcasting said combined information signal through atmospheric free-space; and a plurality of receivers, each receiver comprising;

means for acquiring a replica of said combined information signal through atmospheric free-space, said atmospheric free-space being subject to multipath such that said replica is inclusive of transmission errors;

means coupled to said acquiring means for splitting said replica of said combined information signal into a first signal path and a second signal path;

frequency (fm) demodulating means in said first signal path for extracting a replica of said unmodulated pilot tone;

means in said second signal path for separating a replica of said multitone QPSK modulated signal substantially from said combined information signal;

third signal processing means in said second signal path coupled to receive said replica of said unmodulated pilot tone and said replica of said multitone QPSK modulated signal for coherently demodulating said replica of said multitone QPSK modulated signal into a replica of said digital representation of said block encoded signal; and fourth signal processing means for decoding said replica of said digital representation of said block encoded signal into output program material with correction of selected short-interval-dependent data errors, narrow-band frequency-dependent data errors and long-interval broadband frequency dependent data errors, such as induced by multipath effects, said output program material being a substantial duplicate of said digitized program material.

2. The system according to claim 1, wherein said first signal processing means is operative to encode said digitized program material according to a block code which is a BCH code having at least 200 data bits and no more than 20 check bits and said fourth signal processing means is operative to decode said block code and to correct selected data errors.

3. The system according to claim 2, wherein said BCH block code is a type having 239 data bits in a 255 bit block.

4. The system according to claim 2 wherein said first signal processing means further includes means for interleaving in time said block encoded digitized program material to temporally spread said digitized program material and wherein said fourth signal processing means includes means for deinterleaving in time said digitized program material with correction in order to enhance resistance to selected short-interval-dependent data errors.

5. The system according to claim 1 wherein said first signal processing means further includes means for interleaving in time said block encoded digitized program material to temporally spread said digitized program material and wherein said fourth signal processing means includes means for deinterleaving in time said digitized program material with correction in order to enhance resistance to selected short-interval-dependent data errors.

6. The system according to claim 4 wherein said analog fm signal and said multitone QPSK modulated signal are sufficiently close to one another in frequency to overlap in spectrum, wherein said separating means in said receiver further includes:

means for cancelling said replica of said analog fm signal in said second signal path in order to permit reuse of common spectrum.

7. A transmitter system for a system for broadcast transmission and reception of an analog signal and digitized program material, including means for producing an analog frequency modulated (fm) signal form a composite baseband signal, and a transmitter for transmission of at least said analog fm signal, wherein said composite broadband signal includes a single unmodulated pilot tone, said transmitter system comprising:

first signal processing means coupled to accept digitized program material from a source of digitized program material for encoding said digitized program material according to an error-correcting block code of predetermined length and predetermined error correcting capability to produce a digital representation of a block encoded signal;

second signal processing means for generating an equivalent of a plurality of equivalent tones which are spaced equally at a baseband between 0 Hz and a selected maximum frequency, each of said equivalent tones being at a frequency which is an integer multiple of a base frequency tone and each one of said equivalent tones being constrained to be phase coherent with said unmodulated pilot tone by means of a master clock, said second signal processing being means coupled to accept said digital representation of said block-encoded signal for quadrature phase shift key (QPSK) modulating each one of said equivalent tones with said digital representation of said block-encoded signal thereby to distribute said digital representation of said block-encoded signal over substantially all of said equivalent tones in order to produce a multitone QPSK modulated signal at a selected intermediate frequency carrier signal;

means for linearly combining said analog fm signal and said multitone QPSK modulated signal, said multitone QPSK modulated signal having a magnitude when combined with said analog fm signal of at least 100 times less than the magnitude of said analog fm signal, to produce a combined information signal; and means for broadcasting said combined information through atmospheric free-space.

8. The transmitter according to claim 7 wherein said first signal processing means further includes means for interleaving in time said block encoded digitized program material to temporally spread said digitized program material in order to enhance resistance to selected short-interval-dependent data errors.

9. The transmitter according to claim 7, wherein said first signal processing means is operative to encode said digitized program material according to a block code which is a BCH code having at least 200 data bits and no more than 20 check bits.

10. The transmitter according to claim 9, wherein said BCH block code is a type having 239 data bits in a 255 bit block.

11. A receiver system for a system for broadcast transmission and reception of an analog signal and digitized program material in the form of a multitone QPSK modulated signal, including means for producing an analog frequency modulated (fm) signal from a composite baseband signal, and a transmitter for transmission of at least said analog fm signal, wherein said composite baseband signal includes a single unmodulated pilot tone, and wherein said digitized program material is encoded according to a block code in a block encoded signal, said receiver system comprising:

means for acquiring a replica of a combined information signal through atmospheric free-space, said atmospheric free-space being subject to multipath such that said replica is inclusive of transmission errors;

means coupled to said acquiring means for splitting said replica of said combined information signal into a first signal path and a second signal path;

frequency (fm) demodulating means in said first signal path for extracting a replica of said unmodulated pilot tone;

means in said second signal path for separating a replica of a multitone QPSK modulated signal substantially from said combined information signal;

first signal processing means in said second signal path coupled to receive said replica of said unmodulated pilot tone and said replica of said multitone QPSK modulated signal for coherently demodulating said replica of said multitone QPSK modulated signal into a replica of said digitized program material; and second signal processing means in said second signal path for decoding said replica of said digital representation of said block encoded signal into output program material with correction of selected short-interval-dependent data errors, narrow-band frequency-dependent data errors and long-interval broadband frequency dependent data errors, such as induced by multipath effects, said output program material being a substantial duplicate of said digitized program material.

12. The receiver system according to claim 11, wherein said digitized program material is encoded according to a block code which is a BCH code having at least 200 data bits and no more than 20 check bits.

13. A method for broadcast transmission and reception of an analog signal and digitized program material, employing means for producing an analog frequency modulated (fm) signal from a composite baseband signal, and a transmitter for transmission of at least said analog fm signal, wherein said composite baseband signal includes a single unmodulated pilot tone, said method comprising the steps of:

encoding, in first signal processing means coupled to accept digitized program material from a source of digitized program material, said digitized program material according to an error-correcting block code of predetermined length and predetermined error correcting capability to produce a digital representation of a block encoded signal;

generating in second signal processing means an equivalent of a plurality of equivalent tones which are spaced equally at a baseband between 0 Hz and a selected maximum frequency, each of said equivalent tones being at a frequency which is an integer multiple of a base frequency tone and each one of said equivalent tones being constrained to be phase coherent with said unmodulated pilot tone by means of a master clock, and quadrature phase shift key (QPSK) modulating each one of said equivalent tones with said digital representation of said block-encoded signal thereby to distribute said digital representation of said block-encoded signal over substantially all of said equivalent tones in order to produce a multitone QPSK modulated signal at a selected intermediate frequency carrier signal;

linearly combining said analog fm signal and said multitone QPSK modulated signal, said multitone QPSK modulated signal having a magnitude when combined with said analog fm signal of at least 100 times less than the magnitude of said analog fm signal, to produce a combined information signal;

broadcasting said combined information signal through atmospheric free-space;

acquiring at each of a plurality of receiving locations a replica of said combined information signal through atmospheric free-space, said atmospheric free-space being subject to multipath such that said replica is inclusive of transmission errors;

splitting said replica of said combined information signal into a first signal path and a second signal path;

extracting a replica of said unmodulated pilot tone from said first signal path;

separating a replica of said multitone QPSK modulated signal substantially from said combined information signal in said second signal path;

coherently demodulating said replica of said multitone QPSK modulated signal into a replica of said digital representation of said block encoded signal in said second signal path using said replica of said unmodulated pilot tone and said replica of said multitone QPSK modulated signal; and decoding a replica of said digital representation of said block encoded signal into output program material with correction of selected short-interval-dependent data errors, narrow-band frequency-dependent data errors and long-interval broadband frequency dependent data errors, such as induced by multipath effects, said output program material being a substantial duplicate of said digitized program material.

14. The method according to claim 13, wherein said first signal processing means is operative to encode said digitized program material according to a block code which is a BCH code having at least 200 data bits and no more than 20 check bits and wherein said decoding step comprises decoding said block code of said replica to correct selected data errors.

15. The method according to claim 14, wherein said BCH block code is a type having 239 data bits in a 255 bit block.

16. The method according to claim 14 further including the step of interleaving in time said block encoded digitized program material of said first signal processing means to temporally spread said digitized program material and further including the step, following said demodulating step, of deinterleaving in time said digitized program material with correction, in order to enhance resistance to selected short-interval-dependent data errors.

17. The method according to claim 13 further including the step of interleaving in time said block encoded digitized program material of said first signal processing means to temporally spread said digitized program material and further including the step, following said demodulating step, of deinterleaving in time said digitized program material with correction, in order to enhance resistance to selected short-interval-dependent data errors.

18. The method according to claim 16 wherein said analog fm signal and said multitone QPSK modulated signal are sufficiently close to one another in frequency to overlap in spectrum, further including the step of:

cancelling said replica of said analog fm signal in said second signal path in order to permit reuse of common spectrum.

19. A method for transmitting, in a broadcast transmission and reception system, an analog signal and digitized program material, including an analog frequency modulated (fm) signal from a composite baseband signal, wherein said composite baseband signal includes a single unmodulated pilot tone, said method comprising the steps of:

encoding, in first signal processing means coupled to accept digitized program material from a source of digitized program material, said digitized program material according to an error-correcting block code of predetermined length and predetermined error correcting capability to produce a digital representation of a block encoded signal;

generating in second signal processing means an equivalent of a plurality of equivalent tones which are spaced equally at a baseband between 0 Hz and a selected maximum frequency, each of said equivalent tones being at a frequency which is an integer multiple of a base frequency tone and each one of said equivalent tones being constrained to be phase coherent with said unmodulated pilot tone by means of a master clock, and quadrature phase shift key (QPSK) modulating each one of said equivalent tones with said digital representation of said block-encoded signal thereby to distribute said digital representation of said block-encoded signal over substantially all of said equivalent tones in order to produce a multitone QPSK modulated signal at a selected intermediate frequency carrier signal;

linearly combining said analog fm signal and said multitone QPSK modulated signal, said multitone QPSK modulated signal having a magnitude when combined with said analog fm signal of at least 100 times less than the magnitude of said analog fm signal, to produce a combined information signal; and, broadcasting said combined information through atmospheric free-space.

20. The method according to claim 19 further including the step of interleaving in time said block encoded digitized program material to temporally spread said digitized program material in order to enhance resistance to selected short-interval-dependent data errors.

21. The method according to claim 19, wherein said first signal processing means is operative to encode said digitized program material according to a block code which is a BCH code having at least 200 data bits and no more than 20 check bits.

22. The method according to claim 21, wherein said BCH block code is a type having 239 data bits in a 255 bit block.

23. A method for receiving an analog signal and digitized program material in the form of a multitone QPSK modulated signal, wherein a composite baseband signal of said analog signal includes a single unmodulated pilot tone, and wherein said digitized program material is encoded according to a block code in a block encoded signal, said method comprising the steps of:

acquiring a replica of a combined information signal through atmospheric free-space, said atmospheric free-space being subject to multipath such that said replica is inclusive of transmission errors;

splitting said replica of said combined information signal into a first signal path and a second signal path;

extracting a replica of said unmodulated pilot tone from said replica of said combined information signal, said unmodulated pilot tone having an amplitude at least 100 times greater than said multitone QPSK modulated signal;

separating a replica of said multitone QPSK modulated signal substantially from said combined information signal in said second signal path; and coherently demodulating said replica of said multitone QPSK modulated signal into a replica of said digital representation of said block encoded signal upon reference to said unmodulated pilot tone at a signal level at least 100 times greater than said digitized program material in said replica of said combined information signal; and decoding said replica of said digital representation of said block encoded signal into output program material with correction of selected data errors, said output program material being a substantial duplicate of said digitized program material.

24. The method according to claim 23, wherein said digitized program material is encoded according to a block code which is a BCH code having at least 200 data bits and no more than 20 check bits.

25. The method according to claim 23, wherein said block encoded signal is further interleaves in time according to an interleaving scheme, further including the step of deinterleaving in time said digitized program material with correction in order to enhance resistance to selected short-interval-dependent data errors.

* * * * *